United States Patent [19]

Brauns et al.

[11] Patent Number: 5,400,361
[45] Date of Patent: Mar. 21, 1995

[54] SIGNAL ACQUISITION DETECTION METHOD

[75] Inventors: Gregory T. Brauns, Whitehall Township, Lehigh County; Ramasubramaniam Ramachandran, King Of Prussia, both of Pa.

[73] Assignee: AT&T Corp., Murray Hill, N.J.

[21] Appl. No.: 83,154

[22] Filed: Jun. 25, 1993

[51] Int. Cl.6 ............... H04B 3/46; H04B 17/00; H04Q 1/20
[52] U.S. Cl. ............................... 375/10; 371/55; 371/57.2
[58] Field of Search .............. 375/10, 106, 110, 114, 375/116; 371/3, 5.1, 5.3, 5.4, 29.1, 57.1, 57.2, 55

[56] References Cited

U.S. PATENT DOCUMENTS

| | | | |
|---|---|---|---|
| 4,161,719 | 7/1979 | Parikh et al. | 371/57.2 |
| 4,442,520 | 4/1984 | Ive et al. | 371/57.2 |
| 4,747,112 | 5/1988 | Blondeau, Jr. et al. | 371/57.2 |
| 4,864,158 | 9/1989 | Koelle et al. | 371/55 |

Primary Examiner—Stephen Chin
Assistant Examiner—Don Vo
Attorney, Agent, or Firm—Scott W. McLellan

[57] ABSTRACT

A method of detecting whether a valid DS1 signal is being received by a receiver. If the receiver does not have a valid signal (loss of signal), then the receiver reads consecutive fixed sized N bit blocks of the received digital signal. Each of the blocks or windows is checked for minimum 1s density. Received consecutive 0s are counted and checked against a maximum. If two sequential blocks of bits satisfy the 1s and consecutive 0s tests, then the received signal is judged valid and an acquisition of signal flag is asserted.

6 Claims, 3 Drawing Sheets

SIGNAL ACQUISITION DETECTION METHOD

BACKGROUND OF THE INVENTION

1. Field of the Invention

This invention relates to digital receivers generally and, more particularly, to signal acquisition detection methods for digital carrier systems or the like.

2. Description of the Prior Art

Digital carrier systems require a fast method to reliably report when a received digital signal is removed and reapplied.

Prior art techniques relied on framing bits embedded in the digital signal matching a predetermined pattern to establish if the digital signal was present or not. Because the framing bits are relatively infrequent compared to the data rate (for a DS1 signal, the data rate is about 1.544 Mbits/second and the framing rate is 8000 bits/second), a relatively long sequence of valid framing bits must be received before a valid signal is indicated.

In an effort to speed up acquisition detection, Bellcore has specified a series of tests that must be satisfied before loss/acquisition of signal status changes. See Bellcore standard TR-TSY-000009 DS1, section 4.1 (Loss of Signal). Implementation of the standard is not specified.

Thus, it is desirable to provide a reliable method of detecting when a valid digital signal is applied to a receiver.

It is additionally desirable to provide an apparatus which reliably implements a reliable digital signal validity detection method.

SUMMARY OF THE INVENTION

These and other aspects of the invention may be obtained generally in apparatus responsive to a digital signal for determining if the digital signal is valid by implementing a method of determining if the digital signal is valid. The method for determining if the digital signal is valid is characterized by the steps of:

reading a bit from the digital signal, the bit having a first state or a second state complementary to the first state;

incrementing a first counter as each consecutive bit of the first state is read;

incrementing a second counter and resetting the first counter as each second state bit is read;

repeating the above steps for N bits;

setting a flag to indicate that a valid digital signal has been received if the first counter is less than a first predetermined number and the second counter is equal to or greater than a second predetermined number; and then clearing the second counter.

BRIEF DESCRIPTION OF THE DRAWING

The foregoing features of this invention, as well as the invention itself, may be more fully understood, from the following detailed description of the drawings, in which.

DETAILED DESCRIPTION

For purposes here, the term "digital signal" includes signal types that are not conventionally thought of as purely binary, such as bipolar signals (discussed below) and binary modulated analog signals.

Figure 4:
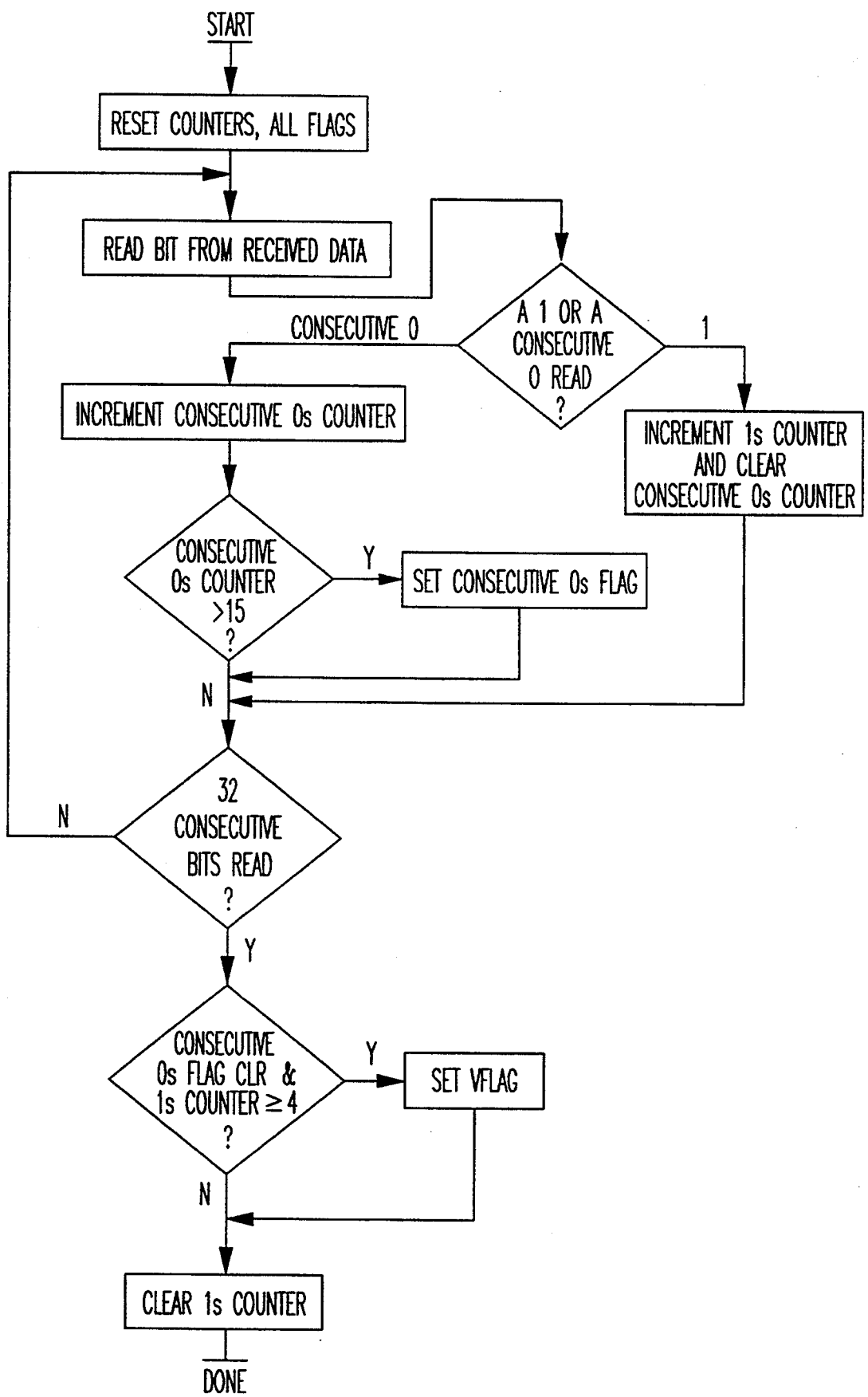
FIG. 4 is a simplified flow chart of a preferred embodiment of a digital validity detection process shown in FIG. 3.

Referring to FIG. 4, the preferred method of detecting if a digital signal is valid may be summarized by reading a bit from the digital signal;

incrementing a consecutive 0s (first) counter for each consecutive 0 read;

incrementing a 1s (second) counter and resetting the consecutive 0s counter for each 1 read;

repeating the above steps for 32 bits;

setting a flag to indicate that a valid digital signal has been received if the consecutive 0s counter is less than 15 (a first predetermined number) and the 1s counter is equal to or greater than 4 (a second predetermined number); and then clearing the 1s counter without clearing the consecutive 0s counter.

Figure 1:
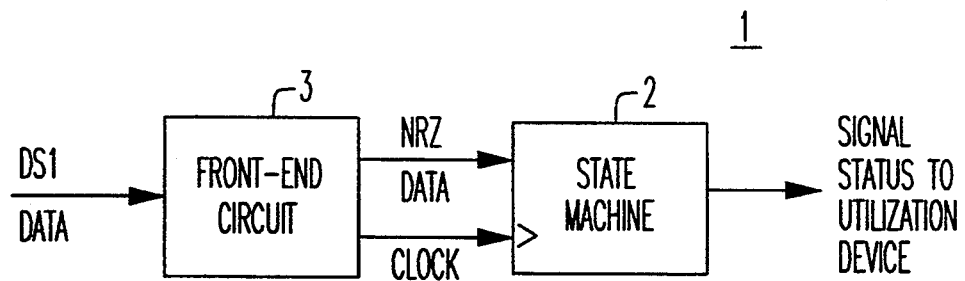
FIG. 1 is a simplified block diagram of a portion of a DS1 digital receiver.

In more detail, an exemplary DS1 digital receiver 1 is shown in FIG. 1. A DS1 signal is a well known digital signal that operates at approximately 1.544 Mbits/second, as discussed above. The signal utilizes alternating mark inverted (AMI) encoding to maintain a near zero DC energy in its signal so that it may be transformer coupled and should be convened into conventional digital levels for further processing. Thus, the received DS1 digital signal is fed to front-end circuit 3 (which includes assorted analog and digital circuitry, not shown) to change the AMI encoded signal to a Non-Return to Zero (NRZ) binary signal and to derive a clock signal from the DS1 signal. The recovered clock signal is used by the state machine 2 (and other circuits within the circuit 3) to synchronize it to the received DS1 signal.

It is noted that the front-end circuit 3 may be designed to convert any predetermined type of signal modulation into the NRZ binary signal usable by the state machine 2.

In the preferred embodiment, the state machine 2 implements a process or method for determining if the DS1 signal is valid. If the signal is valid, as will be discussed in detail below, an Acquisition Of Signal (AOS) status signal is asserted for use by a utilization device (not shown), such as a computer, channel bank, etc. If no signal is detected, as will be discussed below, then a Loss Of Signal (LOS) status signal is asserted to the utilization device. Typically, the LOS and AOS signals are complementary and may be combined into one signal, such as a received signal status. For purposes here, the signals are generated separately by different processes within the state machine 2 and are combined later as will be discussed below in connection with FIG. 2. As a result, the state machine 2 has two "major states": AOS and LOS. When the DS1 signal is applied, the machine 2 asserts AOS until loss of signal is detected. Similarly, LOS will be asserted until a valid signal is detected.

Figure 2:
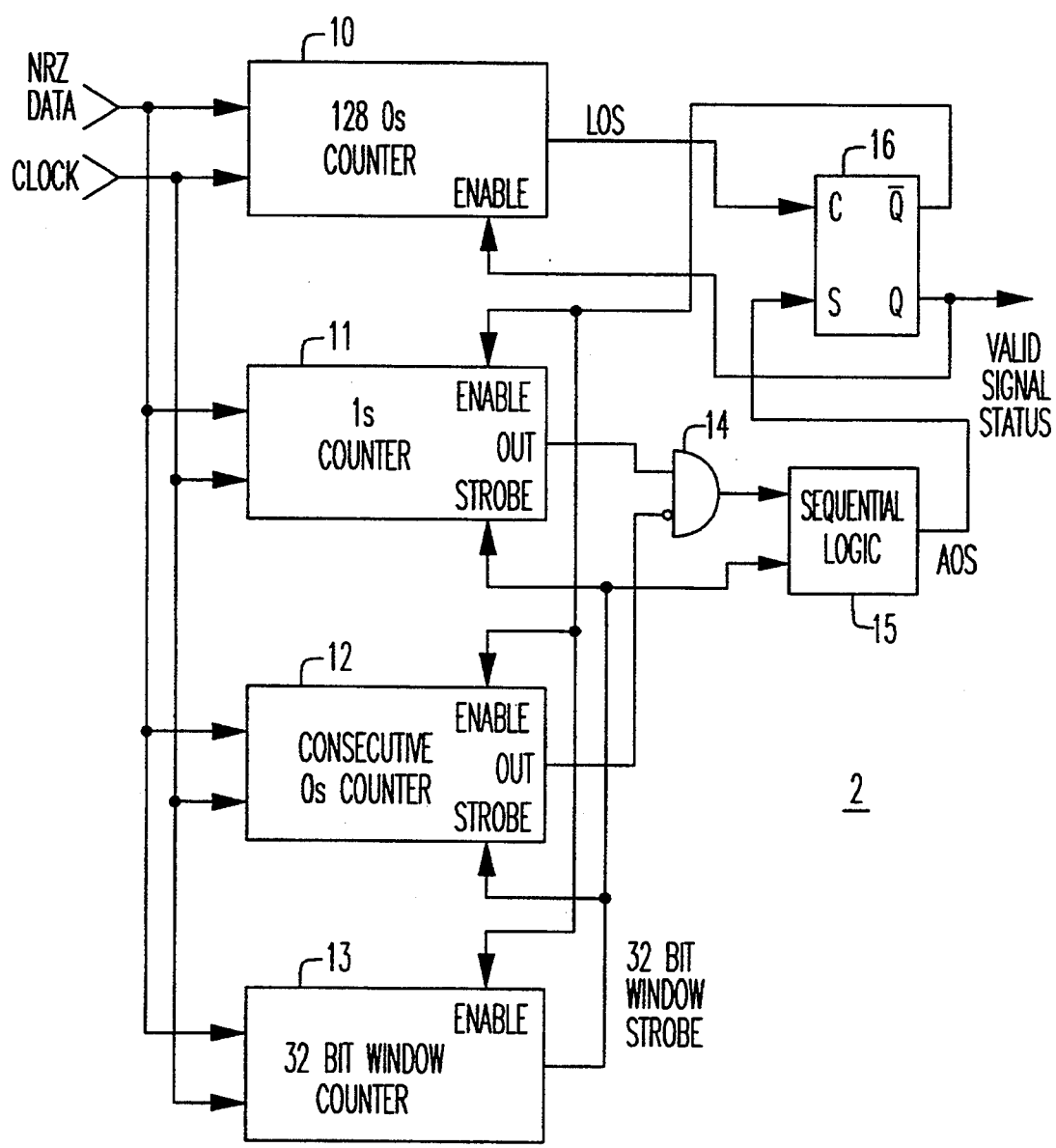
FIG. 2 is a simplified block diagram of an exemplary hardware equivalent implementation of the state machine of FIG. 1.

In FIG. 2, an exemplary hardware implementation of the state machine 2 is shown to help illustrate the invention. The received DS1 signal (after conversion into the NRZ format, discussed above) is applied to an 128 0s counter 10, 1s counter 11, consecutive 0s counter 12 and a thirty two bit window counter 13. The 128 0s counter 10 determines if loss-of-signal (LOS) has occurred by counting the number of consecutive 0s in the received signal and asserting LOS if the number equals or exceeds 128. This clears the valid signal status signal from flip-flop 16. The 1s counter 11, consecutive zeros counter 12, and the thirty two bit window counter 13 cooperate to determine if a valid signal is being received.

Figure 3:
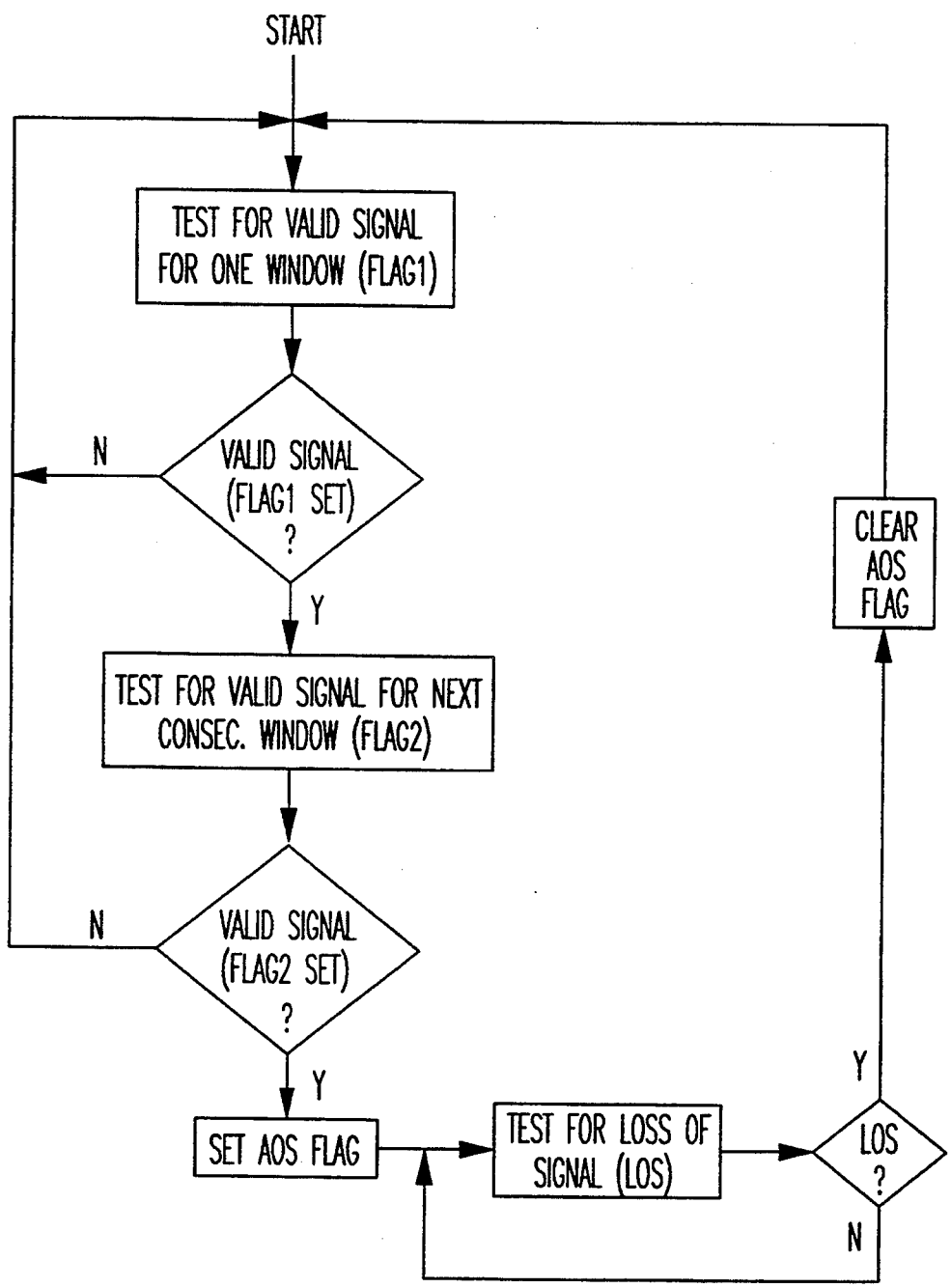
FIG. 3 is a simplified flow chart of the operation of the state machine of FIG. 1.

The operation of machine 2 is briefly described herein. For a 32 bit window as defined by counter 13, counter 11 counts the number of 1s received and counter 12 counts the maximum number of consecutive zeros received. If more than four 1s are received during the 32 bit window (minimum 1s density), then the output of counter 11 is asserted. Similarly, if more than fifteen consecutive 0s are received (maximum consecutive 0s), then the output of counter 12 is asserted. As discussed above, if more than four 1s and less than fifteen consecutive 0s are received over two consecutive windows, then a valid signal is being received. Gate 14 combines the outputs of counters 11 and 12 to indicate to sequential logic 15 that the 1s density was satisfactory over the received window and the number of consecutive 0s did not exceed a maximum. Sequential logic 15, conventional logic circuitry responsive to the window counter 13, sets flip-flop 16 to assert a valid signal status signal after two consecutive windows with a valid received signal. Note that the counters 11, 12 and 13 are enabled when the flip-flop 16 is clear (no valid signal status signal) and counter 10 is enabled when flip-flop 16 is set (valid signal status signal). Thus, the machine 2 toggles between LOS and AOS states (invalid and valid received signal status). This is shown in FIG. 3 which illustrates the overall flow of operations in the state machine 2.

Assuming that the state machine 2 (FIG. 1) is initially in a state of no valid signal being received, the state machine first tests to see if a valid signal is being received for a 32-bit window. The first test indicates the result by a flag (FLAG1) being set or asserted. If no valid signal is being received (FLAG1 not set), then the state machine 2 loops back and checks again for a valid signal. If, however, the FLAG1 was set, the state machine 2 checks for a valid signal for the next, consecutive, 32-bit window (FLAG2). If FLAG2 is not set, then no valid signal was received and the above process repeats for finding two consecutive 32-bit windows with a valid signal being received. If FLAG2 was set, then two consecutive windows with a valid signal was received and the AOS (valid received signal) flag is asserted. Then the state machine 2 begins to check for the loss of signal. The LOS test may be the 128 consecutive 0s test discussed above in connection with counter 10 (FIG. 2). If loss of signal is determined, then the AOS flag (valid received signal) flag is cleared, and the entire process is begun again.

One implementation of the valid signal test discussed above is shown in FIG. 4 and is similar in operation to the machine 2 of FIG. 2. For purposes here, the steps shown may be thought of as a subroutine executed from the steps shown in FIG. 3. As a consequence and for simplicity, the validity flag VFLAG used herein refers to the corresponding flags FLAG1, FLAG2 of FIG. 3.

When called, the routine shown initially resets all counters and flags. Then a bit is read from the incoming data and is tested if it is a 0 or 1. If it is a 0, then if the previous bit was a 0, the consecutive 0s counter is incremented. In this implementation, a flag CONSEC_0s is set if the number of consecutive zeros exceeds a predetermined number, here fifteen. If the read bit is a 1, then the 1s counter is incremented and the consecutive 0s counter is cleared. The above is repeated for a window of 32 consecutively read bits of data. The flag CONSEC_0s is then tested to see if it is not set (is clear) and the number of 1s counted is equal to or greater than a second predetermined number, here 4. If the test is true, then the validity flag VFLAG is set or, if false, VFLAG remains clear. Then the 1s counter is cleared and the process in FIG. 3 is resumed.

The flag CONSEC_0s is used here as a "memory" because if a 1 is read, then the consecutive 0s counter is reset: This allows the routine to check if an excessive number of zeros is being received for a valid signal. Alternatively, it is envisioned that other implementations may be used that do not necessarily need the CONSEC_0s flag for proper operation.

It is understood that the states of the bits may be inverted for purposes of this valid signal detection method (e.g., number of 0s and consecutive 1s). Further, the sizes of the windows may vary (along with the corresponding limits of ones and consecutive zeros) and need not be contiguous. Still further, the tests done on the number of 1s and consecutive 0s may be made differently, such as the number of 1s being greater than a predetermined number (e.g., three), and the maximum number of consecutive 0s being less than a predetermined number (e.g., sixteen). It is also understood that the above process is not limited to testing DS1 signals for validity. In addition, the embodiment of the invention is not limited to a state machine and may be implemented by, for example, a microprocessor or a programmable logic array.

Having described the preferred embodiment of this invention, it will now be apparent to one of skill in the an that other embodiments incorporating its concept may be used. Therefore, this invention should not be limited to the disclosed embodiment, but rather should be limited only by the spirit and scope of the appended claims.

We claim:

1. An apparatus responsive to a digital signal for determining if the digital signal is valid by implementing a method of determining if the digital signal is valid, the method being CHARACTERIZED BY THE STEPS OF:
   A. reading a bit from the digital signal, the bit having a first state or a second state complementary to the first state;
   B. incrementing a first counter as each consecutive first state bit is read;
   C. incrementing a second counter and resetting the first counter as each second state bit is read;
   D. repeating steps A, B and C for N bits;
   E. setting a flag to indicate that a valid digital signal has been received when the first counter is less than a first predetermined number and the second counter is equal to or greater than a second predetermined number; and then
   F. clearing the second counter.

2. The method as recited in claim 1, wherein the steps A–F are repeated for a second set of N bits and the received digital signal is valid when the flag is set for both sets of N bits.

3. The method as recited in claim 2, wherein the first and second sets of N bits are contiguous.

4. The method as recited in claim 3, further characterized by the step of:

G. setting an additional flag when the value of the first counter exceeds the first predetermined number;

H. clearing the additional flag at the end of reading the N bits;

wherein the flag is set when the additional flag is not set and the second counter is greater than the second predetermined number.

5. The method as recited in claim 3, wherein the digital signal is a DS1 signal, the first state is a 0, the second state a 1, N=32, the first predetermined number is 15 and the second predetermined number is 4.

6. The method as recited in claim 5, wherein the steps are performed by a digital state machine.

* * * * *